United States Patent [11] 3,615,740

[72] Inventor Kurt Goltz
       Exton, Pa.
[21] Appl. No. 7,992
[22] Filed Feb. 2, 1970
[45] Patented Oct. 26, 1971
[73] Assignee Pennwalt Corporation
       Philadelphia, Pa.

[54] CHROMATE CONVERSION COATING COMPOSITIONS CONTAINING PRUSSIDE ACCELERATOR
9 Claims, No Drawings

[52] U.S. Cl. ..................................................... 106/14,
       117/127, 148/6.2, 148/6.27
[51] Int. Cl. ..................................................... C09d 5/08
[50] Field of Search ............................................ 106/14;
       148/6.2, 6.27; 117/127

[56] References Cited
UNITED STATES PATENTS

| | | | |
|---|---|---|---|
| 2,796,371 | 6/1957 | Ostrander et al. ............ | 148/6.2 |
| 2,988,465 | 6/1961 | Newhard et al. ............... | 148/6.2 |
| 3,348,979 | 10/1967 | Murphy et al. ............... | 148/6.2 |

Primary Examiner—Lorenzo B. Hayes
Attorneys—Stanley Litz and Carl A. Hechmer, Jr.

ABSTRACT: A composition for applying a chromate conversion coating on aluminum comprised of hexavalent chromium, fluoride, and a prusside as an accelerator selected from the group consisting of $Na_2[Fe(CN)_5NH_3]$; $Na_3[Fe(CN)_5NH_3]$; $Na_3[Fe(CN)H_2O]$; $Na_2[Fe(CN)_5H_2O)]$ and $Na_3[Fe(CN)_5NO_2]$.

CHROMATE CONVERSION COATING COMPOSITIONS CONTAINING PRUSSIDE ACCELERATOR

This invention relates to a composition and method for forming a chromate conversion coating on aluminum and aluminum alloys. More particularly, this invention concerns a chromate and fluoride-based conversion coating composition for treating aluminum and aluminum alloys containing at least one specifically named prusside compound as an accelerator.

The normally used method for treating aluminum and aluminum alloys to provide long lasting corrosion protection, and/or to promote adhesion thereto of an organic finish, such as a paint or lacquer, is to apply a bonded chromate conversion coating by immersing the aluminum in an aqueous solution containing chromate ion and fluoride ion and an accelerator to accelerate the chromate conversion coating action. The present invention provides an improvement over previously known chromate conversion chromate compositions, such as disclosed in U.S. Pat. No. 2,796,370 describing a ferrocyanide or ferricyanide accelerator. The practice of this invention permits the application of suitable conversion coatings to aluminum in from about 10 to 15 percent less time than required with the previously known compositions, using equivalent accelerator concentrations. This time savings results in sharply reduced costs in modern plant operations where thousands of tons of aluminum are processed through complex and expensive coating equipment.

The composition of this invention useful in the art of applying a bonded coating on aluminum and aluminum alloy surfaces comprises a mixture of hexavalent chromium, a fluorine-bearing compound and a prusside selected from the group consisting of $Na_2[Fe(CN)_5NH_3]$; $Na_3[Fe(CN)_5NH_3]$; $Na_3[Fe(CN)_5H_2O]$; $Na_2[Fe(CN)_5H_2O]$ and $Na_3[Fe(CN)_5NO_2]$, in proportions capable of coating said aluminum and alloys thereof.

The composition of this invention in the preferred embodiment comprises an aqueous solution having a pH within the range of about 1.2 to about 2.2, more preferably 1.5 to 2.0, and containing in solution from about 1 to 10 grams per liter of hexavalent chromium ion, from about 0.1 gram to about 10 grams per liter of fluoride ion (plain and/or complexed), small amounts of optional and nonessential other materials such as nitrates and metal ions including iron, nickel and zinc ions and alkali metal and alkaline earth metal ions, and as an accelerator from about 0.1 gram to about 10 grams/liter, more preferably 0.5 to 2 grams/liter, of a prusside compound selected from the group consisting of: $Na_2[Fe(CN)_5NH_3]$; $Na_3[Fe(CN)_5NH_3]$; $Na_3[Fe(CN)_5H_2O]$; $Na_2[Fe(CN)_5H_2O]$ and $Na_3[Fe(CN)_5NO_2]$.

The hexavalent chromium ion in the conversion coating composition can be provided by chromic acid or water soluble salts thereof such as sodium bichromate, potassium bichromate, sodium chromate and potassium chromate. The fluoride ion can be supplied by such representative fluorine-bearing compounds as sodium fluoborate, sodium fluoride, potassium fluoride, sodium fluosilicate, potassium fluosilicate, ammonium fluosilicate, ammonium fluoride, magnesium fluoride and the like. The pH of the solution can be adjusted, if necessary, by addition of mineral acids thereto such as nitric acid or fluosilicic acid. The prusside compounds embodied in the compositions are known materials and methods for their preparation may be found in the literature, e.g., Gmelin's Handbuch der Inorganischen Chemie, 8, Ausgabe, Band Eisen B.

According to the method of this invention, the aluminum (which is first advantageously cleaned by conventional methods to remove organic matter residues and metallic oxides) is treated with the aqueous-coating solution of the invention by immersion, brushing or spraying at a temperature within the range of about 0° C. to 50° C., preferably room temperature, i.e. about 20° C. to 35° C. As stated previously, the advantage of the present invention is that reduced treatment times are possible, e.g., from about three seconds to about fifteen seconds depending on the type of operation, are sufficient using the present composition to apply adequate corrosion protective and adhesion-promoting coatings to the aluminum thus treated.

The data presented in the following examples illustrate the improved results from the present composition and demonstrates the impossibility of predicting whether a specific compound will be a good coating accelerator. For instance, it is demonstrated that prusside compounds similar to those claimed herein give either comparatively poor results in chromate conversion coating or are almost totally inoperative.

A typical chromate conversion coating stock solution is prepared comprising an aqueous solution containing 4.5 grams/liter chromic acid; 3.9 grams/liter $(NH_4)_2SiF_6$ and 1.7 grams/liter $Na_2SiF_6$; the pH is adjusted to 1.8 with nitric acid, and to separate portions of this solution an accelerator compound is added in the concentrations as set forth hereinbelow.

Panels of 3003 aluminum alloy are cleaned in a conventional, aqueous, alkaline, silicate-phosphate soak cleaner. The aluminum panels are dipped in the chromate conversion coating bath for 15 seconds at room temperature. The weight of the coatings applied to the aluminum panels in milligrams per square foot is determined according to the "National Coil Coaters Association" Bulletin II-2. The results of the tests using the various accelerators are set forth in the following table.

| Ex. | Accelerator | Accelerator concentration, g./l. | Coating weight, mg./ft.² |
|---|---|---|---|
| 1 | Control (no accelerator) | 0 | 1.5 |
| 2 | $Na_4[Fe(CN)_6] \cdot 10H_2O$ (U.S. 2,796,370) | 0.4 | 12.9 |
| 3 | $Na_4[Fe(CN)_6] \cdot 10H_2O$ | 0.8 | 21.0 |
| 4 | Same as above | 1.5 | 20.0 |
| 5 | $Na_3[Fe(CN)_5AsO_2]$ | 1.5 | 8.4 |
| 6 | $Na_5[Fe(CN)_5SO_3]$ | 1.5 | (¹) |
| 7 | $Na_2[Fe(CN)_5NO] \cdot 2H_2O$ | 0.5 | 1.4 |
| 8 | $Na_3[Fe(CN)_5CO]$ | 0.7 | 10.4 |
| 9 | $Na_4[Fe(CN)_5NO_2]$ | 1.5 | 13.1 |
| 10 | $Na_3[Fe(CN)_5NO_2]$ | 1.5 | 22.5 |
| 11 | $Na_3[Fe(CN)_5NH_3]$ | 1.4 | 22.0 |
| 12 | $Na_2[Fe(CN)_5NH_3]$ | 0.5 | 24.0 |
| 13 | Same as above | 1.3 | 23.0 |
| 14 | $Na_3[Fe(CN)_5H_2O]$ | 1.5 | 23.8 |
| 15 | $Na_2[Fe(CN)_5H_2O]$ | 0.4 | 15.2 |

¹ Negligible effects.

The foregoing results show that the accelerators of the claimed composition (Examples 10-15) give markedly higher coating weights compared to similar compositions containing no additive, the prior art accelerator, or structurally similar compounds.

I claim:

1. A composition for applying a corrosion resistant coating to aluminum and aluminum alloys comprising an aqueous solution having a pH within the range of about 1.2 to about 2.2 containing a water-soluble chromium compound in which the chromium is in hexavalent form in a quantity sufficient to provide from about 1 to 10 grams per liter of solution of hexavalent chromium ion, a fluorine-bearing compound in a quantity sufficient to provide from about 0.1 gram to about 10 grams per liter of solution of fluoride ion, and from about 0.1 gram to about 10 grams per liter of a prusside selected from the group consisting of $Na_2[(Fe(CN)_5NH_3)]$; $Na_3(Fe(CN)_5NH_3)$; $Na_3(Fe(CN)_5H_2O)$; $Na_2(Fe(CN)_5H_2O)$ and $Na_3(Fe(CN)_5NO_2)$.

2. A composition in accordance with claim 1 wherein the pH of the solution is within the range of 1.5 to 2.0 and the concentration of the prusside is from 0.5 to 2 grams/liter.

3. A composition according to claim 1 wherein the prusside is $Na_2(Fe(CN)_5NH_3)$.

4. A composition according to claim 1 wherein the prusside is $Na_3(Fe(CN)_5NH_3)$.

5. A composition according to claim 1 wherein the prusside is $Na_3(Fe(CN)_5H_2O)$.

6. A composition according to claim 1 wherein the prusside is $Na_2(Fe(CN)_5H_2O)$.

7. A composition according to claim 1 wherein the prusside is $Na_3(Fe(CN)_5NO_2)$.

8. A method for forming a bonded coating on aluminum and aluminum alloys which comprises contacting the surface of said metal with an aqueous solution having a pH within the range of about 1.2 to about 2.2 containing a water-soluble chromium compound in which the chromium is in hexavalent form in a quantity sufficient to provide from about 1 to 10 grams per liter of solution of hexavalent chromium ion, a fluorine-bearing compound in a quantity sufficient to provide from about 0.1 gram to about 10 grams per liter of fluoride ion, and from about 0.1 gram to about 10 grams per liter of a prusside selected from the group consisting of $Na_2(Fe(CN)_5NH_3)$; $Na_3(Fe(CN)_5NH_3)$; $Na_3(Fe(CN)_5H_2O)$; $Na_2(Fe(CN)_5H_2O)$ and $Na_3(Fe(CN)_5NO_2)$.

9. The method according to claim 8 wherein the aqueous solution is defined by claim 2.